United States Patent [19]

Harris

[11] 3,743,215
[45] July 3, 1973

[54] SWITCHING SYSTEM AND METHOD FOR MISSILE GUIDANCE CONTROL IN A TVM SYSTEM

[75] Inventor: J. L. Harris, Madison, Ala.

[73] Assignee: The United States of America as represented by the Secretary of the Army, Washington, D.C.

[22] Filed: Aug. 25, 1971

[21] Appl. No.: 174,917

[52] U.S. Cl. ............................. 244/3.14, 244/3.19
[51] Int. Cl. ........ F41g 7/14, F41g 9/00, F41g 11/00
[58] Field of Search .......................... 244/3.14, 3.15

[56] References Cited
UNITED STATES PATENTS
3,363,858   1/1968   Dobbins et al..................... 244/3.14

*Primary Examiner*—Benjamin A. Borchelt
*Assistant Examiner*—Thomas H. Webb
*Attorney*—Harry M. Saragovitz, Edward J. Kelley et al.

[57] ABSTRACT

In switching from earth-based radar data to missile-borne radar data for missile guidance in a TVM system the data from each radar receiver is compared to determine when switching of the guidance control is most feasible. In target-via-missile (TVM) guidance, data from an earth-based radar is used to guide an interceptor missile part of the way to a target, then data from a radar receiver on board the interceptor missile is used to guide the interceptor for the remainder of the flight. The missile-borne sensor receives a signal which is transmitted by earth-based radar and reflected by the target. This signal is processed to yield data proportional to the pointing error of the missile-borne tracking antenna. The pointing error data from the missile-borne radar is transmitted to a system computer and therein processed to yield the desired guidance information.

5 Claims, 5 Drawing Figures

J. L. Harris,
INVENTOR.

J. L. Harris,
INVENTOR.

SWITCHING SYSTEM AND METHOD FOR MISSILE GUIDANCE CONTROL IN A TVM SYSTEM

SUMMARY OF THE INVENTION

In a target-via-missile (TVM) guidance system, a signal is transmitted by the system radar on the ground, reflected by the target, and received by the radar receiver on board the interceptor. The signal is processed to some degree on board the interceptor, then relayed to the earth-based system computer. The data furnished to the system computer is two components of the pointing error of the missile-borne radar antenna. The pointing errors of the sensor can be shown to be proportional to line-of-sight rate, $\lambda$. The angle $\lambda$ is between an arbitrary reference line of the missile and the line-of-sight therefrom to the target. The pointing errors are smoothed by computer processes and used to calculate commands to be sent to the interceptor, using proprotional navigation guidance.

In the phase of flight prior to terminal, commands are calculated by proportional navigation guidance. In this phase the line-of-sight rate is determined by smoothing and differentiating the line-of-sight angle determinations from the relative position of the target and interceptor. The purpose of the TVM phase of guidance is to provide data which becomes more accurate as intercept approaches. As intercept becomes imminent, the data from the ground radar is much noiser than the TVM data. The terminal (TVM) guidance phase begins when the TVM data becomes better (less noisy) than data from the earth-based radar. It is possible to estimate this occurrence by comparing the noise in the on-board pointing errors to the noise in the line-of-sight rate estimations made with the earth-based radar. This is done with a system computer.

DESCRIPTION OF THE PREFERRED EMBODIMENT

For a smoothing process using a linear least squares fit of the $n$ most time recent data points, the equation of a line is determined for which the summation of the squares of the deviations of the line from each data point is a minimum. This summation of deviations squared yields a measure of the noise in the data. The slope of the straight line is used as the rate of change of the variable being smoothed. Rate of change is needed for the earth-based radar data only. The summation of deviations squared gives a measure of the noise in the TVM data, since that data is pointing error and pointing error is proportional to line-of-sight rate. The summation of deviations squared of the earth-based radar determined line-of-sight data is not used directly as a measure of line-of-sight rate noise, but for a specified smoother length, the error in slope is related to the error in smoothed quantity. Thus, the summation of deviations squared for the earth-based radar LOS data is multiplied by a constant factor for comparison with the summation of deviation squared of TVM data. This comparison allows transition to terminal phase of guidance at the optimum time, and accounts for instantaneous geometry effects. For smoothers other than linear least squares, the difference between the current smoothed quantity and the current measurement is still evaluated, and the squares of a number of these differences are summed.

Figure 1:
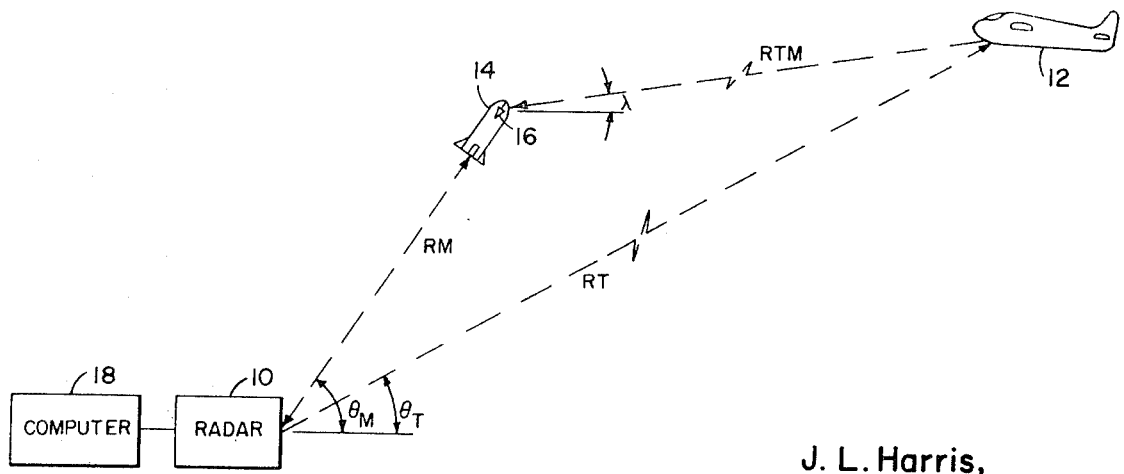
FIG. 1 is a diagramic representation of a missile intercept system in which the present invention is contained.

FIG. 1 discloses a system drawing wherein an earth-based radar 10 is aligned for tracking a target 12 and simultaneously providing guidance and track for a missile 14. A target seeker or sensor 16 in missile 14 is also aligned for tracking target 12. Information is transmitted back from missile 14 to radar 10 for coupling to a system computer 18. Computer 18 uses the data received from the missile and target, providing missile guidance and sensor position for maintaining an intercept trajectory.

Implementation in TVM guidance requires that the missile on-board sensor 16 acquire target 12 sometime before the beginning of the terminal guidance phase. Prior to the beginning of the terminal guidance phase the TVM data is used for sensor positioning only. When the TVM sensor data becomes better than the data from earth-based radar 10, as the missile nears the target TVM guidance assumes control. This transition of control occurs when the instantaneous TVM data becomes less noisy than the instantaneous data from the earth-based radar. For an interceptor approaching the target from a direction resulting in a very low apparent radar cross section, guidance with the ground based radar data can be better until near impact or throughout the encounter. Similarly, for a ground based radar located such that the target has a low apparent radar cross section, terminal phase guidance can begin at an earlier time than calculations based on the average radar cross section of the target would indicate.

Figure 2:
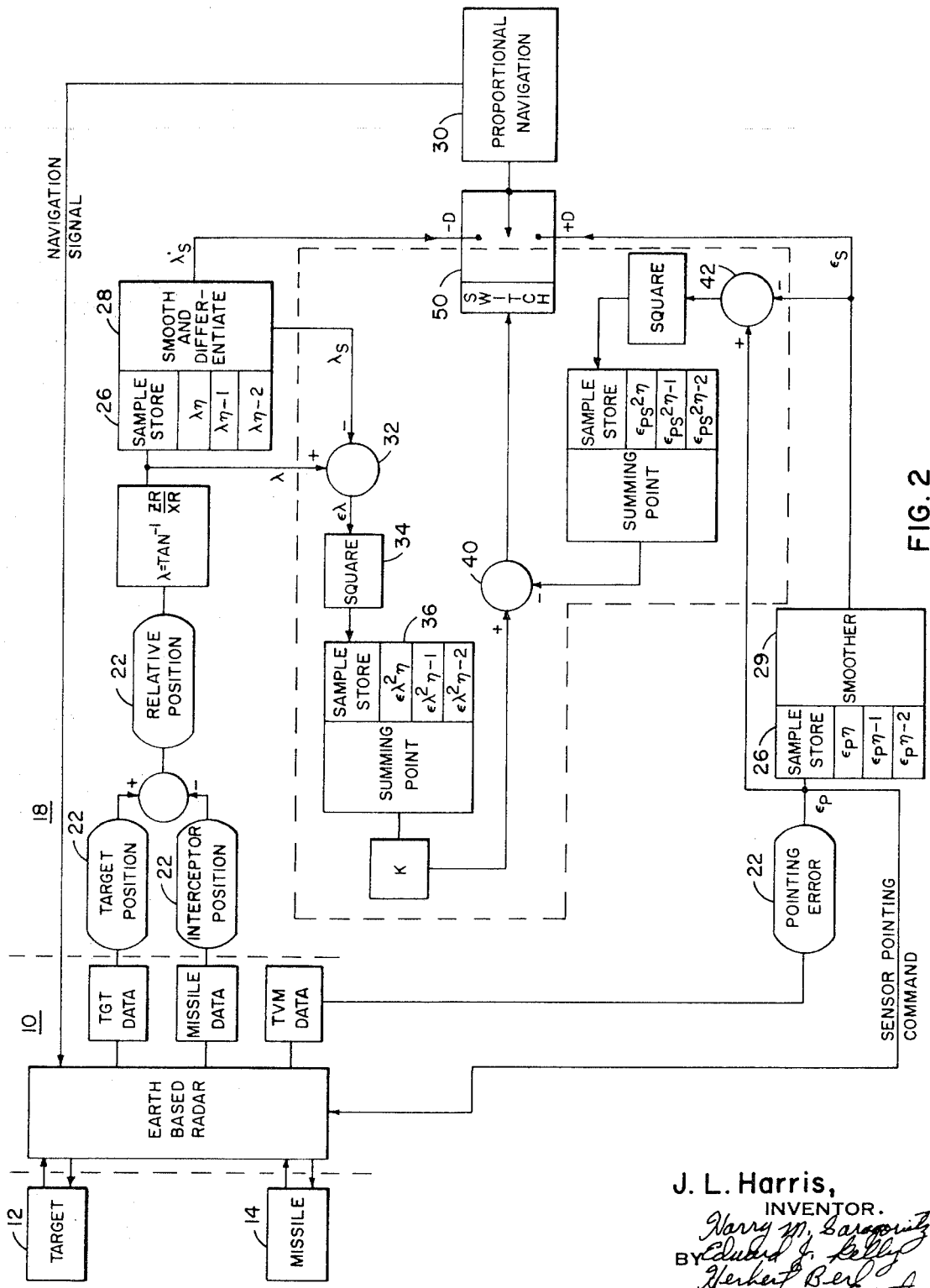
FIG. 2 is a block diagram showing a preferred form of the invention with the additional computer stages necessary for providing the switching function.

As shown in FIG. 2, signals received from missile 14 and target 12 are processed by radar 10 and coupled to computer 18. TVM data from interceptor missile 14, providing the missile pointing error, is processed separately while the target position and interceptor position are summed to produce a relative position therebetween. Computer processing of tracking signals is as shown in input-output boxes 22, with the line-of-sight angle $\lambda$ being determined from the difference of target-interceptor position. Each received angle $\lambda$ is processed through a sample and store network 26 and then through smooth and differentiating circuitry 28 for processing by the proportional navigation network 30. The navigation signals are then transmitted back to the missile for correctional guidance thereof. A similar process is followed in averaging the received pointing error with stored error signals. Instantaneous pointing error $\epsilon_p$ is used to generate a correctional signal to missile 14 for maintaining alignment of sensor 16 with target 12. For providing the switching function which allows TVM guidance to become dominant, additional computer circuitry is necessary. The instantaneous line-of-sight (LOS) angle $\lambda$ and time averaged LOS angle $\lambda_s$ are coupled to a differential amplifier 32. An output signal from amplifier 32 is coupled through a squaring network 34 to sample and store circuit 36. Sample and store circuit 36 allows the instantaneous signal to be averaged with previous samples stored therein, the averaged signal being multiplied by a porportionality constant K and coupled to a differential amplifier 40. In a similar manner instantaneous pointing error $\epsilon_p$ is coupled to a differential amplifier 42 where it is combined with a sample of the pointing error average $\epsilon_s$. The pointing error $\epsilon_s$ is a smoothed signal coupled from smoothing network 29 to differential amplifier 42. The output of differential amplifier 42 is squared, coupled through a sample and store network wherein it is summed and then coupled to differential amplifier 40. Differential amplifier 40 compares the processed LOS angle input signal with the pointing error signal, providing a differential output control signal to a control switch 50. Control switch 50 determines which signal the proportional navigation equipment 30 will follow. While the earth-based radar computation of the relative position between target and interceptor provides the better signal, $\epsilon_p$ and $\epsilon_s$ will provide the dominant input to amplifier 40 maintaining control of the switch in the −D position, allowing the pointing error rate $\lambda_s$ to be coupled to proportional navigation equipment 30 for controlling the direction of rotation of missile on the flight path. When the difference between $\lambda$ and $\lambda_s$ dominates the output of differential amplifier 40 the control switch switches to the +D position allowing the smoothed $\epsilon_s$ output to control the proportional navigation signal to the missile. Prior to this time $\epsilon_p$ has been providing the sensor pointing commands to the missile.

The instantaneous interceptor 14 position with respect to earth-based radar 10 is subtracted from the target position with respect to the earth-based radar. This yields relative positions, from which the line-of-sight angle between the missile and the target is computed. Line-of-sight angle $\lambda$ is smoothed and differentiated to give an estimated line-of-sight rate $\dot{\lambda}$. This rate, $\dot{\lambda}$, is used to guide the interceptor during the initial phase of guidance. During the transition to TVM, the difference between the current smoothed line-of-sight angle and the instantaneous measurement is obtained in an operational amplifier and is squared and summed with n previous difference values. The summed resultant signal is multiplied by a proportionality constant K, which relates error in $\lambda_s$ to error in $\lambda_s$, and compared to a similar quantity which has been calculated for the TVM data. For the TVM data, the instantaneous pointing error $\epsilon_p$ supplied from missile 14 is received by radar 10 and subtracted from the smoothed pointing error measurement $\epsilon_s$. An operational amplifier or other differencing means provides this function. This difference, $\epsilon_p − \epsilon_s$, is squared and summed with a number of previous values, yielding the quantity indicative of TVM noise. When the TVM noise quantity is greater than the earth radar noise quantity, TVM data is not used to guide the interceptor, only to position the seeker. When the TVM noise indicator becomes smaller, then the TVM data is used for guidance also. During the guidance TVM phase the interceptor transmits its instantaneous angular pointing error to the system computer. These pointing errors are smoothed and used to send a pointing command to the seeker on board the interceptor. They are also used to calculate a command to guide the interceptor during the TVM phase.

Figure 3:
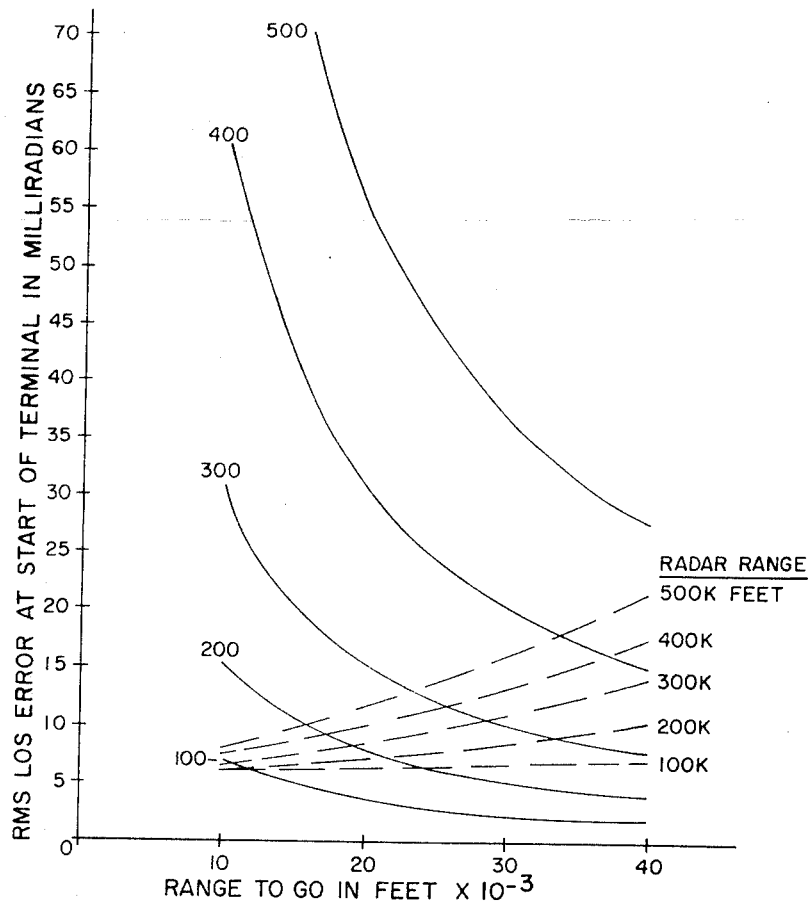
FIG. 3 is a graph comparing the line-of-sight errors between land based radar and TVM sensor tracking.
Figure 4:
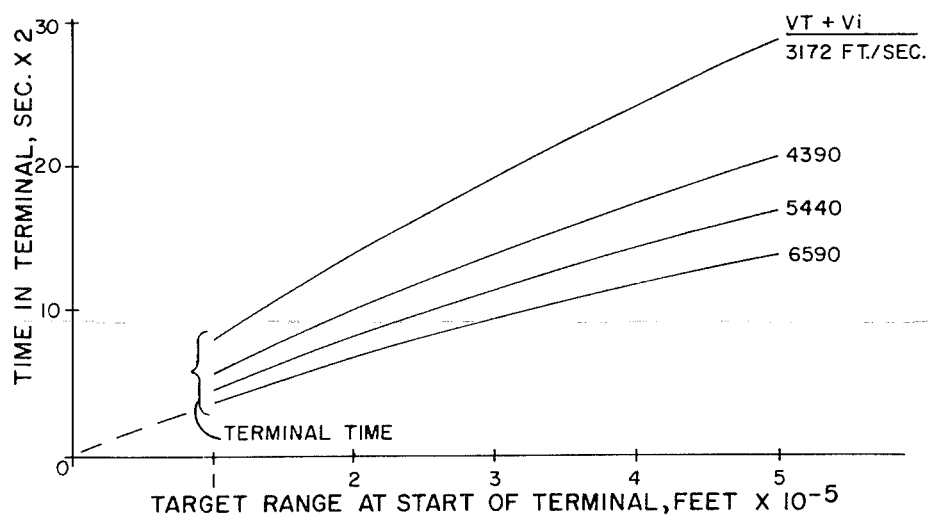
FIG. 4 is a typical graph showing the approximate terminal range and time in terminal phase of guidance as functions of target range and closing velocity.
Figure 5:
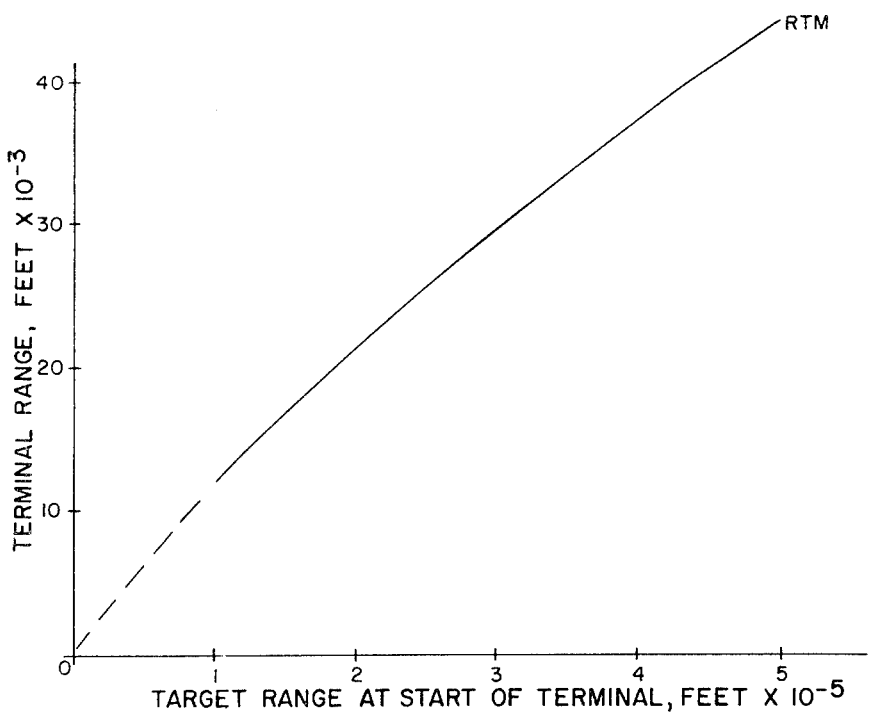
FIG. 5 is a graph showing the range to go at start of terminal guidance.

As shown in FIG. 3, for the earth-based radar processed signals in LOS angle determination, the error in LOS increases rapidly as the range to go decreases to zero. The TVM data signal increases in accuracy as range to go decreases. FIG. 4 shows the time spent in terminal for several closing velocities, as a function of target range at start of terminal. FIG. 5 shows the range to go at start of terminal as a function of target range at start of terminal. FIGS. 4 and 5 are derived assuming switching to TVM guidance at the optimum time. These graphs are typical of target and radar tracking curves.

In the TVM system the data for guidance and tracking is processed in the earth-bound system computer rather than in a specialized missile-borne unit. Since both the earth-based radar and the TVM link yield line-of-sight angles with associated noise errors, noise errors and LOS angle determinations are compared in the computer for determining the point of transition to TVM guidance.

Obviously many modifications and variations of the present invention are possible. It is to be understood therefore that within the scope of the appended claims the invention may be practiced otherwise than as specifically described.

I claim:

1. In a missile guidance system having an earth-based radar tracking station for target tracking and missile guidance, wherein energy reflected by a target is processed by said tracking station and compared with missile position trajectory for providing missile navigation signals, the improvement of a guidance switching system for providing enhanced terminal guidance comprising: a target sensor within said missile responsive to reflected radar energy from said target for providing missile-target positional signals and sensor pointing error signals for transmission to said radar tracking station; a tracking station computer for processing said missile navigation signals and said sensor pointing error signals to provide directional guidance and sensor pointing commands for said missile; and switching means responsive to the difference between sensor pointing error signals and missile-target line-of-sight angle signals for switching said directional guidance response to the dominant signal, said switching means having first, second and third differential amplifiers, said first amplifier being connected for coupling computer calculated instantaneous and averaged, missile-target, line-of-sight angle signals thereto, said second amplifier being connected to said computer for coupling instantaneous and averaged missile sensor pointing error signals thereto, and said third amplifier having inputs coupled to outputs of said first and second differential amplifiers for responding to the difference therebetween to provide a negative or positive navigation switching signal output.

2. A guidance switching system as set forth in claim 1 and further comprising a switch responsive to the positive or negative output signal of said third differential amplifier for coupling pointing error or line-of-sight angular rate signals to said radar, and first and second squaring circuits connected between respective outputs of said first and second amplifiers and said third amplifier inputs.

3. In a guidance system for directing a missile toward a target being tracked, a method for changing the mode of target tracking for enhancing terminal guidance while maintaining missile trajectory toward said target, comprising the steps of:
  a. periodically directing pulses of high frequency energy from an earth based radar station toward said target during missile trajectory toward said target,
  b. receiving and detecting radar energy directly reflected from said target by said radar station for determining relative target position,
  c. transmitting navigation and target sensor positional signals from said radar station toward said missile in response to said detected radar energy from said target for guiding said missile toward said target,
  d. detecting and processing reflected radar energy from said target by a sensor within said missile,
  e. transmitting sensor processed energy signals from said missile to said radar station,
  f. comparing said sensor processed signals with said directly reflected signals for determining which received signals are most noise free, and
  g. switching from transmitting missile navigation signals in response to directly reflected energy to transmitting missile navigation signals in response to received sensor processed signals when said compared sensor processed signal noise is less than said directly reflected energy noise for terminal guidance of said missile to said target.

4. A method for changing the mode of guidance as set forth in claim 3 and further comprising the steps of:
  a. obtaining the difference between instantaneous sensor processed signals and preceeding, averaged sensor processed signals,
  b. determining the missile-target line-of-sight (LOS) angle,
  c. combining the instantaneous LOS angle with preceeding averaged LOS angles for obtaining the difference signal therebetween, and
  d. comparing the LOS angle difference signal with the sensor processed difference signal and transmitting said missile navigation signals in response to the most noise free signal.

5. A method for changing the mode of guidance as set forth in claim 4 and further comprising the steps of:
  a. periodically directing pulses of high frequency energy from an earth-based radar station toward said missile during trajectory thereof toward said target, and
  b. receiving and detecting radar energy directly reflected from said missile by said radar station for obtaining missile position relative to said target position.

* * * * *